United States Patent
Wade et al.

(10) Patent No.: US 9,560,936 B2
(45) Date of Patent: Feb. 7, 2017

(54) BLADE ASSEMBLY FOR FOOD PROCESSOR AND FOOD PROCESSOR INCORPORATING SAME

(71) Applicant: Kenwood Limited, Havant, Hampshire (GB)

(72) Inventors: Adam Wade, Havant (GB); Martin Hunt, Havant (GB)

(73) Assignee: KENWOOD LIMITED, Havant, Hampshire (GB)

( * ) Notice: Subject to any disclaimer, the term of this patent is extended or adjusted under 35 U.S.C. 154(b) by 2 days.

(21) Appl. No.: 14/432,374

(22) PCT Filed: Sep. 10, 2013

(86) PCT No.: PCT/GB2013/052363
§ 371 (c)(1),
(2) Date: Mar. 30, 2015

(87) PCT Pub. No.: WO2014/049329
PCT Pub. Date: Apr. 3, 2014

(65) Prior Publication Data
US 2015/0230663 A1   Aug. 20, 2015

(30) Foreign Application Priority Data
Sep. 28, 2012   (GB) ...................................... 1217328

(51) Int. Cl.
*A47J 43/07* (2006.01)
(52) U.S. Cl.
CPC ................... *A47J 43/0722* (2013.01)
(58) Field of Classification Search
CPC .................................................. A47J 43/0722

USPC ................. 241/282.1, 282.2, 292.1
See application file for complete search history.

(56) References Cited

U.S. PATENT DOCUMENTS

| | | | |
|---|---|---|---|
| 3,139,917 A | 7/1964 | Elmore | |
| 3,884,423 A * | 5/1975 | Wilson | B01F 7/162 241/282.1 |
| 5,823,672 A | 10/1998 | Barker | |
| 6,364,226 B1 | 4/2002 | Kubicko | |
| 2004/0046075 A1 | 3/2004 | Gursel | |

(Continued)

OTHER PUBLICATIONS

Search Report dated Jan. 27, 2013 from corresponding Great Britain Application No. 1217328.2 (1 page).

(Continued)

*Primary Examiner* — Mark Rosenbaum
(74) *Attorney, Agent, or Firm* — Brinks Gilson & Lione; G. Peter Nichols

(57) ABSTRACT

A blade assembly for a food processing appliance includes a shaft and a base member in which one end of the shaft is journalled for rotation about its axis. First and second blade members are mounted to the shaft at respective axial locations and extend radially and in opposite directions from their respective locations on the shaft, with the blade member nearer the free end of the shaft being angled back along the shaft towards the base member and the other blade member angled forwardly along the shaft, towards the free end. The first blade member further has associated therewith a relatively short and blunt stub-like blade portion angled forwardly from the support location for the first blade member and extending beyond the free end of the shaft.

15 Claims, 3 Drawing Sheets

(56) References Cited

U.S. PATENT DOCUMENTS

Figure 1:
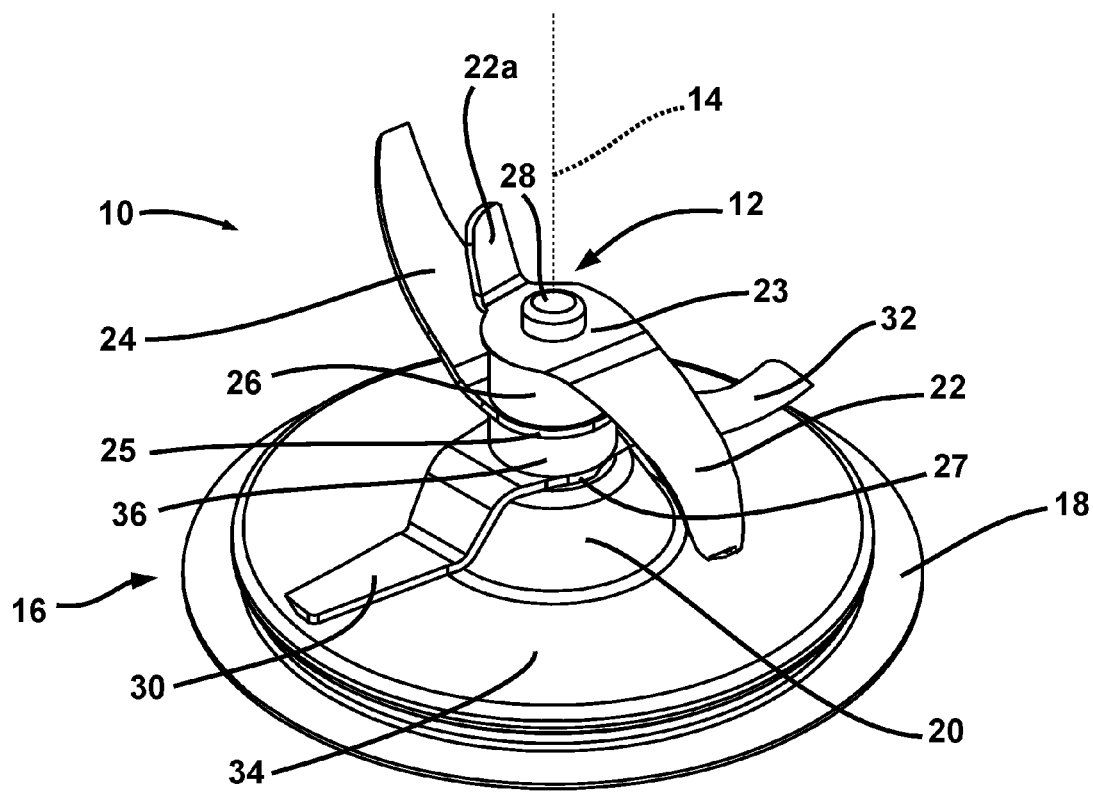

| | | | |
|---|---|---|---|
| 2004/0206837 A1* | 10/2004 | Lee .................... | A47J 43/0722 |
| | | | 241/282.2 |
| 2009/0114616 A1 | 5/2009 | White et al. | |
| 2010/0246320 A1* | 9/2010 | Sands ................. | A47J 43/0722 |
| | | | 366/246 |
| 2011/0149677 A1* | 6/2011 | Davis .................. | A47J 43/042 |
| | | | 366/205 |
| 2012/0091245 A1* | 4/2012 | Menashes ........... | A47J 43/0722 |
| | | | 241/282.1 |

OTHER PUBLICATIONS

PCT/GB2013/052363 International Search Report dated Oct. 11, 2013 (2 pages).

* cited by examiner

BLADE ASSEMBLY FOR FOOD PROCESSOR AND FOOD PROCESSOR INCORPORATING SAME

This application claims priority to International Application No. PCT/GB2013/052363 filed Sep. 10, 2013 and to Great Britain Application No. 1217328.2 filed Sep. 28, 2012; the entire contents of each are incorporated herein by reference.

This invention relates to blade assemblies for food processors, and to food processors incorporating such blade assemblies.

Food processors are versatile appliances, and are used in the kitchen for a wide variety of tasks, such as liquidising and blending, for soups and drinks, crushing ice cubes and general chopping of fruit and vegetables. Indeed, the range of tasks which the appliances are expected to perform is ever-expanding, particularly with increased awareness of exotic foods and healthy eating. However, in some areas at least, the operational ability of traditional food processors can be somewhat compromised and improved performance is required.

One area in which improved performance is sought is the efficiency of the interaction between the food processor's blades and the materials, ingredients or foodstuffs being processed. It is one object of the invention to provide blade assemblies with such improved performance.

A related aspect to blade assembly design is the internal configuration of the vessel in which the food processing is carried out. This vessel is usually referred to as a "goblet" or a "jug", and will hereinafter referred to as a "goblet", though it will be appreciated that this term is intended to encompass any kind of vessel in which food processing may be carried out. In particular, the internal configuration of the goblet in the area thereof, usually referred to as the "throat area" which, in operation, surrounds the blade assembly requires remedial attention. A typical goblet has a narrow "throat" and ledge area to guide liquids and food stuffs onto the cutting blades, and the traditional cutting blades typically consist of a number of pairs of cutting blades, the blades of each pair being formed from a single strip/plate of metal. Typically, the blades of a bottom pair are angled down towards the base of the goblet, and the blades of one or more additional pairs are angled upwards into the goblet.

It is thus another object of the invention to provide, in combination, improved blade assemblies and food processor goblets with improved internal configurations.

According to the invention from one aspect, there is provided a blade assembly for a food processor; the assembly comprising an elongate shaft means adapted to be driven in rotation about an axis extending longitudinally of the shaft means, and a generally discoidal base member having a central boss in which one end of the shaft means is journalled for rotation and being adapted for sealing fitment to an open base of a goblet in which processing is intended to take place, the assembly further comprising first and second blade members supported on said shaft means for rotation therewith about said axis; said blade members extending in substantially opposed radial directions from said shaft means and being supported on said shaft means at respective axially spaced locations there-along; wherein said first blade member is mounted nearer to the free end of the shaft means than is the second blade member and is angled back along the shaft towards the base member, whereas the second blade member is angled forwardly along the shaft, towards the free end thereof; and wherein said first blade member further has associated therewith a relatively short and blunt stub-like blade portion angled forwardly from the support location for the first blade member and extending beyond the free end of said shaft means.

This stub-like portion of the blade member is effective to physically deflect foodstuffs into the operative area of the remaining blade members of the blade assembly, thereby increasing significantly the versatility of the blade assembly, and may be orientated at any angle relative to the shaft, but preferably it initially extends in a direction radially opposite the first blade member and is bent forwardly relatively steeply, so as to make an angle in the range from 65 degrees to 71 degrees with a normal to the longitudinal axis of the shaft means.

Preferably, the lengths of the first and second blade members and their respective anglings along the shaft are such that the tip of the first blade member is at least as close to the base member as is the mounting location of the second blade member, whereas the tip of the second blade member is at least as far from the base member as is the mounting location of the first blade member.

In some preferred embodiments, the first and second blade members are similarly profiled and are formed with respective somewhat concave curvatures in the direction of rotation.

In some preferred embodiments, the first and second blade members are formed of similar materials.

In alternative preferred embodiments, the first and second blade members are formed of dissimilar materials.

In further preferred embodiments of the invention, the locations at which the first and second blade members are supported on said shaft means are separated by a distance in the range from 8 mm to 12 mm along said axis, the preferred separation being 10 mm.

In some such embodiments, the first blade member is angled back along the shaft, to aid the base member, at an angle in the range from 19 degrees to 25 degrees with a normal to the longitudinal axis of the shaft means. In further preferred embodiments, the second blade member is angled forwardly along the axis, away from the base member, at an angle in the range from 25.5 degrees to 31.5 degrees with a normal to the longitudinal axis of the shaft means.

In further preferred embodiments, the shaft also supports, at a third location there-along, a bottom blade pair of radially opposed blade members; one being configured to closely follow a floor-like surface of the base member, and the other being angled downwardly towards said base member.

Where the bottom blade pair is provided, it may conveniently be axially separated, along said shaft means, from the second blade member by a distance in the range from 5 mm to 9 mm, preferably 7 mm.

In many preferred embodiments of the invention, at least the first and second blade members are each formed as a flat member which is bent in its plane, without twisting, to create the angle it along the shaft as required.

Blade assemblies in accordance with any of the foregoing embodiments of the invention may further be provided with one or more additional blade members located nearer the free end of the shaft than the upper blade member, farther from the free end of the shaft than the lower blade member and/or between the upper and lower blade members.

It is another aspect of the invention to provide a, in combination, a goblet with any of the foregoing blade assemblies according to the first aspect of the invention sealingly mounted thereto; wherein the goblet is formed with a smooth internal surface in the vicinity of the blade assembly.

In some preferred embodiments of this aspect of the invention, said internal surface is of substantially constant diameter in the vicinity of said blade assembly.

In other preferred embodiments, said internal surface is smoothly reduced in diameter, in somewhat frusto-conical form, in the vicinity of said blade assembly.

Figure 2A:
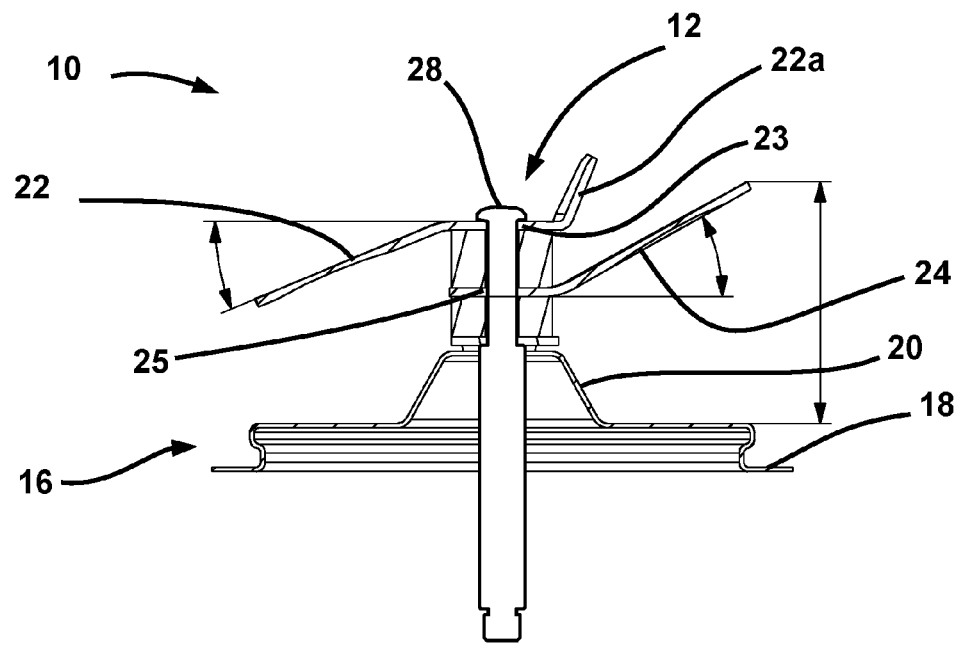
Figure 2B:
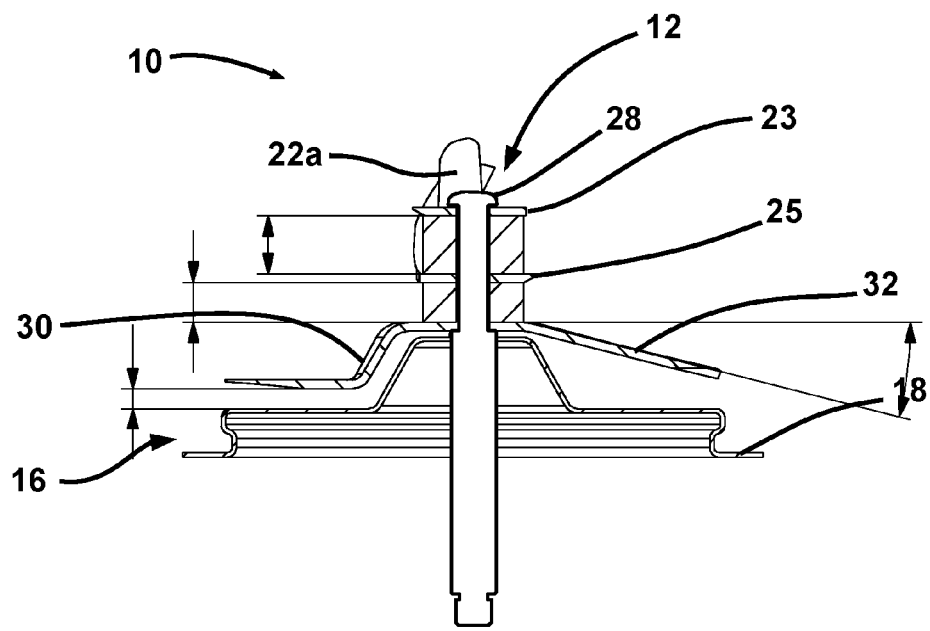
Figure 3:
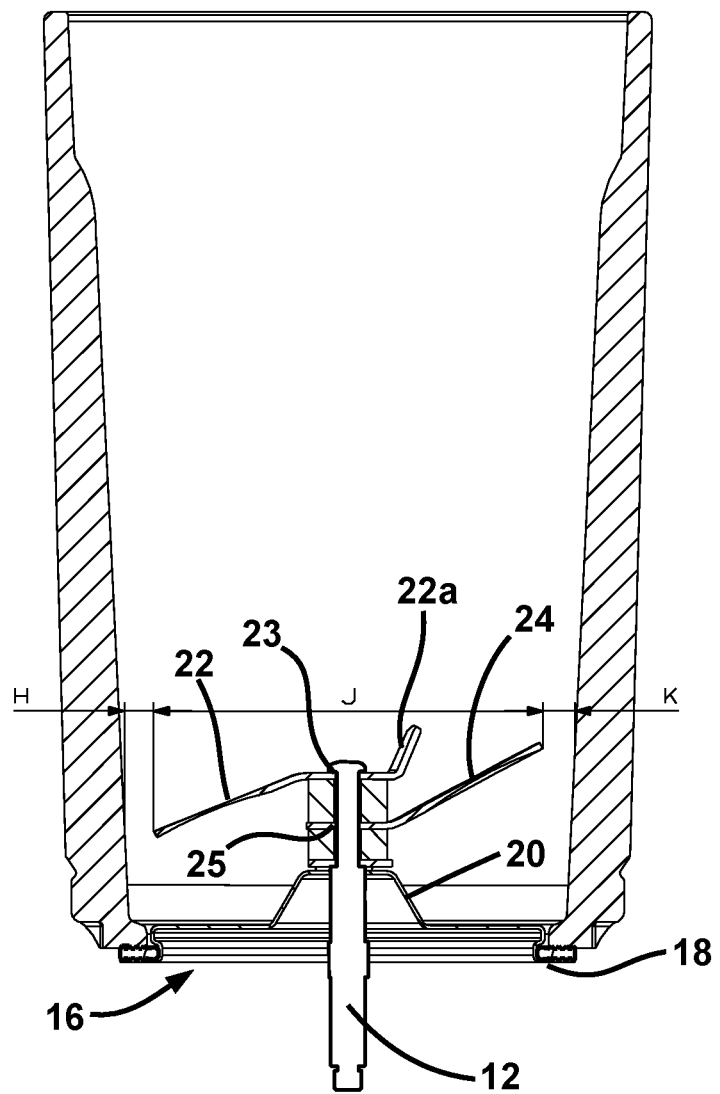

In order that the invention may be clearly understood and readily carried into effect, certain embodiments thereof will now be described, by way of example only, with reference to the accompanying drawings, of which:

FIG. 1 shows a tiered and interleaved blade assembly in accordance with one example of the invention;

FIGS. 2(a) and 2(b) show orthogonal sectional views of the assembly, to illustrate spacing and angling configurations typical of the invention; and FIG. 3 shows a combined blade assembly and goblet in accordance with a further aspect of the invention, illustrating the longer exposed cutting edges and wider internal base jug diameter typical of this aspect.

Referring now to the drawings, similar features in all of which are indicated by the same reference numbers, a blade assembly 10 in accordance with one example of the invention comprises an elongate shaft 12, rather in the nature of a stub axle, adapted to be driven in rotation about an axis 14 extending longitudinally of the shaft 12. The assembly 10 is formed as a fitment adapted to be sealingly fitted (in conventional manner) to an open base of a goblet, jug or other receptacle in which the blade assembly is to rotate. In this example, the fitment comprises a generally discoidal base member 16 having a periphery 18 formed with a rabbet to retain a sealing ring and having a central boss 20 in which one end of the shaft 12 is journalled for rotation. The boss 20 is typically raised from the base member 16 and, in this example, the boss 20 is formed as a truncated pyramid, in order to accommodate sealed bearings to promote the smooth running of the shaft 12 when driven from beneath, in conventional fashion, by a drive outlet of a food processor base unit (not shown) which can take any of a number of forms, as is known in the art.

First and second blade members 22 and 24 are mounted to the shaft in axially spaced relationship at respective locations 23 and 25; the blade members being supported by the shaft 12 and mounted for rotation with it about the axis 14. The blade members 22 and 24 extend in substantially opposed radial directions from their respective locations 23 and 25 on the shaft 12.

In order to support the blade members 22 and 24 with the desired axial separation on the shaft 12, it is convenient to provide a spacer 26 between the blade members. Other spacing techniques that will be known to those skilled in the art are equally usable, however, and the invention is not restricted to the use of spacers such as 26. In this case, the two blade members 22 and 24 are similarly shaped, in that their cutting edges are each somewhat concave in the direction of rotation. The two blades could differ in cutting profiles if preferred, however, and their cutting surfaces may, if preferred, be formed with features, such as serrations, to enhance cutting or to provide a desired cutting performance.

In any event, an important issue in relation to this example of the invention is that the blade member 22 nearer the free end 28 of the shaft 12 (the upper of the two blades in general usage) is angled back along the shaft towards the base member 16 whereas the blade member 24 is angled forwardly along the shaft, towards the free end 28. The lengths of the blade members and their respective angling along the shaft are such that the tip of blade 22 is at least as close to the base member 16 as is the mounting location 25 of the blade member 24 and, similarly, the tip of blade member 24 is at least as far from the base member 16 as is the mounting location 23 of the blade member 22.

Typically, though not necessarily, the first and second blade members 22 and 24 are formed of similar materials and, in this example, both blade members are of standard metallic construction. In some embodiments of the invention, however, dissimilar materials are used; for example one blade member may be of standard metallic construction and the other may be formed of a self-sharpening carbide. Alternatively, one blade member may be of plastics material and the other of a metallic material.

In preferred embodiments of the invention, the locations 23 and 25 at which the first and second blade members 22, 24 are supported on the shaft are separated by a distance in the range from 8 mm to 12 mm along the axis 14; a particularly preferred separation being 10 mm.

In some such embodiments, the blade member 22 nearer the free end 28 of the shaft 12 is angled back along the shaft, toward the base member 16, at an angle in the range from 19 degrees to 25 degrees with a normal to the longitudinal axis 14 of the shaft 12, whilst the other blade member 24 is angled forwardly along the axis, away from the base member 16, at an angle in the range from 25.5 degrees to 31.5 degrees with a normal to the longitudinal axis 14 of the shaft 12.

The first blade member 22 further has associated therewith a relatively short and blunt stub-like blade portion 22a angled forwardly from the support location for the first blade member 22 and extending beyond the free end of the shaft 12. This stub-like portion 22a is effective to physically deflect foodstuffs into the operative area of the remaining blade members of the blade assembly 10, thereby increasing significantly the versatility of the blade assembly.

The stub-like portion 22a may be orientated radially at any angle relative to the shall 12, but preferably it initially extends in a direction radially opposite the first blade member 22, and is bent forwardly relatively steeply, so as to make an angle in the range from 65 degrees to 71 degrees with a normal to the longitudinal axis 14 of the shaft 12.

In this example, the stub-like portion 22a is formed integrally with the first blade member 22. This need not necessarily be the case, however, and the two components 22 and 22a can be formed separately from one another, and may even be formed of different materials if preferred.

Typically, the shaft 12 also supports, at a third location 27 there-along, a bottom blade pair of radially opposed blade members 30 and 32. In this example, blade member 30 is configured to closely follow the profile of the boss 20 and the floor surface 34 of the base member 16, whilst the blade member 32 is simply angled along the shaft 12 and downwardly towards the floor surface 34 of the base member 16.

The bottom blade pair is, in this example, axially separated, along said shaft 12, from the lower blade member 24 by a distance in the range from 5 mm to 9 mm; preferably 7 mm, and this can be achieved, for example by the use of a spacer 36.

It will be appreciated from the foregoing that the invention provides a tiered and interleaved cutting blade assembly comprising at least two cutter blades such as 22, 24 configured as discrete, radially-extending blades, rather than diametrically-extending pairs, wherein the blade 22 nearer the free end 28 of the shaft 12 (the upper blade in operation of the assembly 10) is angled downwards towards the base 16 and the other blade 24 (the lower blade in operation of the assembly 10) is angled upwards, away from the base 16.

This arrangement provides significantly different yet overlapping cutting paths that increase the cutting performance. Assemblies in accordance with the invention also provide, as compared with conventional blade assemblies of the kind known hitherto and using pairs of blades at the same working diameter, significantly longer exposed ground edge lengths on the blades for cutting.

Blade assemblies in accordance with the present invention also present a reduced mechanical load on the driving motor due to the use of a smaller overall working diameter compared to using the same exposed ground edge length with traditional paired blades joined centrally.

To prevent food-stuffs resting upon the upper blade 22, particularly when operating the assembly 10 at slow speeds (i.e. below 5000 rpm) a formed piece (not shown) can be attached to the upper surface of blade 22 to agitate or disturb foods that may rest in this area.

The spacing between the discrete blades 22 and 24, along with their respective anglings along the shaft axis 14, in any particular embodiment of the invention can significantly affect the performance of the assembly 10, as the tiered blades allow exact positioning of the principal processing elements, within a small overall tool assembly diameter, to promote optimum fluid flow in the internal jug profile.

The use of discrete blades also facilitates customisation for particular blade shapes at varying heights to allow optimum results for specific food processes.

Use of discrete blades also facilitates rotational balancing of individual blades, therefore reducing susceptibility to vibrations exhibited by pairs of blades.

The use of spacers and discrete blades need not only be used exclusively for the top two blades. All blade positions may be discrete in nature, spaced accordingly in the same fashion.

The spacers such as 26 are preferably formed of stainless steel. However, they may alternatively be made of, or include, other materials, such as moulded polymer resins or elastomers which may be provided to allow damping and dynamic movement to the assembly.

The spacers such as 26, moreover, are typically annular forms with parallel faces at the ends to clamp the blades, with the blades themselves being formed to take the required angle. It is envisaged, however, that the spacers such as 26 could be formed in such a way as to impose the necessary angling upon planar flat blades, therefore reducing the cost of blade manufacture.

Alternatively, the spacers such as 26 may also be eliminated altogether and positioning provided by an overmoulded polymer resin which provides both cost effective manufacture and a good seal between spacer and blade.

The blades such as 22 and 24 used in the assembly 10 are typically manufactured from stainless steel and ground for cutting purposes. However, blades of other materials and hardnesses may be used and in some circumstances, as previously mentioned, it is envisaged that blades of differing materials might be used at various positions, optimised for different food processing types or performance.

It will be appreciated that blade assemblies in accordance with the invention are envisaged in which the first and second blade members are supplemented by one or more additional blade members disposed on the shaft 12 at one or more selected locations along the axis 14. Clearly any such additional blade member(s) could be located nearer the free end 28 of shaft 12 than the upper blade member 22, farther from the free end 28 of the shaft 12 than the lower blade member 24 and/or between the upper and lower blade members 22 and 24. Such additional blade member(s) may, moreover, take any form and be located at any radial orientation about the axis 14. Additional blade members may be angled, like the first and second blade members, along the axis 14 or they may be disposed orthogonally to the axis 14, or a combination of angled and orthogonal blade members may be used. Supplemental blade members may be provided as individual radial blades, like blade members 22 and 24, or they may comprise blade pairs or other multiple blade forms, such as tri- or quad-blades.

As mentioned above, it is another aspect of the invention, to provide, in combination, a goblet with any of the foregoing blade assemblies according to the first aspect of the invention sealingly mounted thereto; wherein the goblet is formed with a smooth internal surface in the vicinity of the blade assembly.

Traditional goblet designs can lead to a number of difficulties when food processing. In particular, the design of the "throat" area used to direct liquids and food stuffs towards the blade assembly can cause problems, as this area is usually reduced in diameter relative to the overlying base area of the goblet proper, and this reduction is often formed as a step with an associated ledge which provides a shelf on which solids can become trapped, leading to the presence of substantial quantities of unprocessed food in the goblet.

The narrow throat diameter used in traditional blenders, however, promotes close proximity of the blades to the inner profile of the goblet, thus providing acceptable processing when using blade assemblies having relatively short blades. It is preferred to use longer blades, however, as facilitated by the first aspect of this invention, since this arrangement provides a larger swept length for cutting foodstuffs. Traditional blender designs having longer pairs or even more pairs of blades are known but, unless properly engineered, the use of longer blades can induce greater mechanical torsional loads on the motor driving the blades.

To overcome these problems, and as shown in FIG. 3, this aspect of the present invention provides in combination, a goblet and cutting blade system in which the internal profile at the base of the goblet, i.e. in the vicinity of the blades, exhibits an internal diameter that is significantly larger than that of traditional goblets. It is preferred either to have the internal diameter of the goblet remain substantially constant in the vicinity of the blade assembly or, if a tapering configuration is used, to make the taper smooth so as to prevent the formation of a ledge in the vicinity of the blade assembly. Alternatively, if the use of a ledge is unavoidable, it is intended to position the ledge as low as possible and to position the blade assembly higher up, into the goblet, giving better exposure to food stuffs and agitation immediately next to the ledge area.

The invention claimed is:

1. A blade assembly for a food processor comprising:
   an elongate shaft adapted to be driven in rotation about an axis extending longitudinally of the shaft,
   a generally discoidal base member having a central boss in which one end of the shaft is journalled for rotation and configured for sealing fitment to an open base of a vessel;
   first and second blade members supported on the shaft for rotation therewith about the axis; the blade members extending in substantially opposed radial directions from the shaft and being supported on the shaft at respective axially spaced locations there-along, wherein the first blade member is mounted nearer to the free end of the shaft than is the second blade member and is angled back along the shaft towards the base member, and the second blade member is angled forwardly along the shaft towards the free end thereof, with the first blade member further having associated therewith a relatively short and blunt stub-like blade portion angled forwardly from the support location for the first blade member and extending beyond the free end of the shaft.

2. The blade assembly according to claim 1, wherein the stub-like blade portion is bent forwardly so as to make an angle in the range from 65 degrees to 71 degrees with a normal to the longitudinal axis of the shaft.

3. The blade assembly according to claim 1, wherein the stub-like portion initially extends from the shaft in a direction radially opposite the first blade member.

4. The blade assembly according to claim 1, wherein a length of the first and second blade members and their respective anglings along the shaft are such that a tip of the first blade member is at least as close to the base member as is the mounting location of the second blade member, and a tip of the second blade member is at least as far from the base member as is the mounting location of the first blade member.

5. The blade assembly according to claim 1, wherein the first and second blade members are similarly profiled and are formed with respective somewhat concave curvatures in the direction of rotation.

6. The blade assembly according to claim 1, wherein the first and second blade members are formed of similar materials.

7. The blade assembly according to claim 1, wherein the respective locations at which the first and second blade members are supported on the shaft are separated by a distance in a range from about 8 mm to about 12 mm along the axis.

8. The blade assembly according to claim 1, wherein the first blade member is angled back along the shaft toward the base member to make an angle in the range from about 19 degrees to about 25 degrees with a normal to the longitudinal axis of the shaft.

9. The blade assembly according to claim 1, wherein the second blade member is angled forwardly along the shaft away from the base member, to make an angle in the range from about 25.5 degrees to about 31.5 degrees with a normal to the longitudinal axis of the shaft.

10. The blade assembly according to claim 1, wherein the shaft also supports, at a third location there-along, a bottom blade pair of radially opposed blade members, one blade of the bottom pair being configured to closely follow a floor-like surface of the base member, and the other blade of the bottom pair being angled downwardly towards the base member.

11. The blade assembly according to claim 10, wherein the bottom blade pair is axially separated, along the shaft, from the second blade member by a distance in the range from about 5 mm to about 9 mm.

12. The blade assembly according to claim 1, wherein at least the first and second blade members are each formed as a flat member which is bent in its plane, without twisting, to angle it along the shaft.

13. The blade assembly according to claim 1, further comprising one or more additional blade members disposed on the shaft and located at one or more predetermined locations along the axis.

14. A vessel with a blade assembly according to claim 1 sealingly mounted thereto; wherein the vessel is formed with a smooth internal surface in the vicinity of the blade assembly.

15. The vessel with blade assembly according to claim 14, wherein the internal surface has a substantially constant diameter in the vicinity of the blade assembly.

* * * * *